United States Patent
Basavaraja et al.

(10) Patent No.: US 11,394,686 B1
(45) Date of Patent: Jul. 19, 2022

(54) DYNAMIC NETWORK ADDRESS TRANSLATION USING PREDICTION

(71) Applicant: Nvidia Corporation, Santa Clara, CA (US)

(72) Inventors: Rohith Basavaraja, Bangalore (IN); Sharath Ramamurthy, Bangalore (IN)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 17/228,725

(22) Filed: Apr. 13, 2021

(30) Foreign Application Priority Data

Feb. 25, 2021 (IN) .............................. 202141008009

(51) Int. Cl.
| | |
|---|---|
| *H04L 61/2521* | (2022.01) |
| *H04L 61/255* | (2022.01) |
| *H04L 45/00* | (2022.01) |
| *H04L 45/741* | (2022.01) |
| *H04L 101/668* | (2022.01) |

(52) U.S. Cl.
CPC ........ *H04L 61/2521* (2013.01); *H04L 45/566* (2013.01); *H04L 45/741* (2013.01); *H04L 61/255* (2013.01); *H04L 2101/668* (2022.05)

(58) Field of Classification Search
CPC . H04L 61/2521; H04L 45/566; H04L 45/741; H04L 61/255; H04L 61/6068
See application file for complete search history.

(56) References Cited

U.S. PATENT DOCUMENTS

| | | | | |
|---|---|---|---|---|
| 10,735,469 | B1* | 8/2020 | Dods | H04L 43/028 |
| 2003/0163583 | A1* | 8/2003 | Tarr | H04L 61/1541 709/245 |
| 2003/0236913 | A1* | 12/2003 | Hoban | H04L 69/161 709/245 |
| 2004/0136356 | A1* | 7/2004 | Kuo | H04L 29/12462 370/395.31 |
| 2011/0280248 | A1* | 11/2011 | Singh | H04L 12/4625 370/401 |

(Continued)

OTHER PUBLICATIONS

"NVIDIA BlueField Data Processing Unit", product brief, pp. 1-4, year 2020.

(Continued)

*Primary Examiner* — Oleg Survillo
*Assistant Examiner* — Monishwar Mohan
(74) *Attorney, Agent, or Firm* — Kligler & Associates Patent Attorneys Ltd (57) ABSTRACT

A method for network communication includes receiving from a first network a data packet having a header specifying a first source address in the first network and a destination address in a second network and looking up the first source address in a network address translation (NAT) table. Upon finding, in response to looking up the first source address, that the first source address is not listed in the NAT table, an entry is added to the NAT table specifying a corresponding second source address in the second network. One or more additional first source addresses that are not listed in the NAT table are predictively selected, and one or more further entries are added to the NAT table specifying one or more second source addresses in the public network corresponding to the one or more additional first source addresses.

30 Claims, 5 Drawing Sheets

(56) References Cited

U.S. PATENT DOCUMENTS

| | | | | |
|---|---|---|---|---|
| 2012/0023257 | A1* | 1/2012 | Vos | H04L 29/12547 |
| | | | | 709/232 |
| 2013/0034099 | A1* | 2/2013 | Hikichi | H04L 61/2532 |
| | | | | 370/392 |
| 2015/0350156 | A1* | 12/2015 | Ma | H04L 61/2557 |
| | | | | 709/245 |
| 2016/0337315 | A1* | 11/2016 | Maestas | G06F 21/577 |
| 2017/0118170 | A1* | 4/2017 | Wang | H04L 61/2517 |
| 2019/0141067 | A1* | 5/2019 | Rodriguez | G06N 3/0445 |

OTHER PUBLICATIONS

Hochreiter et al., "Long Short-Term Memory," Neural Computation, vol. 9, No. 8, pp. 1735-1780, year 1997.

Colah, "Understanding LSTM Networks," Colah's Blog, Deep Learning, NLP, and Representations, pp. 1-14, posted Aug. 27, 2015, as downloaded from http://colah.github.io/posts/2015-08-Understanding-LSTMs/.

* cited by examiner

DYNAMIC NETWORK ADDRESS TRANSLATION USING PREDICTION

FIELD OF THE INVENTION

The present invention relates generally to packet network communications, and particularly to methods and apparatus for network address translation (NAT).

BACKGROUND

Network address translation (NAT) is a method of remapping one Internet Protocol (IP) address space into another by modifying network address information in the IP headers of packets passing through a router or other switching device. It has become a popular and essential tool in conserving global IP address space, since it allows one or a small number of Internet-routable IP addresses of a NAT gateway to be used for an entire private network. NAT is also commonly used in load balancing applications.

In a typical configuration, a local network uses one or more private IP address subnets. A router in the local network has a private address in this private address space. The router is also connected to an external network, such as the Internet, with one or more public IP addresses. As traffic passes from the local network to the Internet, the router applies NAT in order to translate the source IP address in each packet on the fly from a private address to a public address. The router tracks header data of the outgoing packets, such as the destination address and protocol port, and uses this information in translating the public IP destination addresses of incoming packets to the appropriate private IP addresses and thus to forward each packet to its destination on the local network.

SUMMARY

Embodiments of the present invention that are described hereinbelow provide improved methods, apparatus, and software for forwarding data packets in a network.

There is therefore provided, in accordance with an embodiment of the invention, a method for network communication, which includes receiving from a first network a data packet having a header specifying a first source address in the first network and a destination address in a second network and looking up the first source address in a network address translation (NAT) table. Upon finding, in response to looking up the first source address, that the first source address is not listed in the NAT table, an entry is added to the NAT table specifying a second source address in the second network corresponding to the first source address. One or more additional first source addresses in the first network that are not listed in the NAT table and from which further data packets are expected to be received are predictively selected, and one or more further entries are added to the NAT table specifying one or more second source addresses in the second network corresponding to the one or more additional first source addresses.

In some embodiments, the first source address and the destination address include Internet Protocol (IP) addresses. In a disclosed embodiment, looking up the first source address includes searching for the entry in the NAT table based on both the first source address and the destination IP address. Additionally or alternatively, the header specifies a protocol port of the data packet, and looking up the first source address includes searching for the entry in the NAT table based on both the first source address and the protocol port.

Further additionally or alternatively, the method includes periodically removing from the NAT table one or more of the entries that have not been accessed over a predefined aging period.

In some embodiments, when the first source address belongs to a given subnet, predictively selecting the one or more additional first source addresses includes selecting at least one additional first source address from the given subnet. In one embodiment, selecting the at least one additional first source address includes adding all the first source addresses in the given subnet to the NAT table.

Additionally or alternatively, predictively selecting the one or more additional first source addresses includes detecting a pattern in the first source addresses of data packets received from the first network, and selecting at least one additional first source address responsively to the detected pattern. In some embodiments, detecting the pattern includes applying a recurrent neural network model to the first source addresses. Additionally or alternatively, detecting the pattern includes filtering the data packets so as to select a set of the first source addresses that are subject to address translation using the NAT table, and applying only the selected set of the first source addresses to the prediction logic in order to detect the pattern. Further additionally or alternatively, detecting the pattern assigning weights to the first source addresses of the data packets responsively to respective frequencies of packet flows from the first source addresses, and applying the weights in the prediction logic in order to detect the pattern.

In some embodiments, the method includes reading from the NAT table the second source address in the second network corresponding to the first source address, inserting the second source address in the header of the data packet in place of the first source address, and transmitting the data packet with the second source address in the header to the second network. In a disclosed embodiment, transmitting the data packet includes modifying, responsively to the entry in the NAT table, at least one field in the header of the data packet, selected from a group of fields consisting of the destination address, a source port, and a destination port. Additionally or alternatively, the method includes receiving from the second network a further data packet having a further destination address identical to the second source address that was inserted in the header of the transmitted data packet, looking up the further destination address in the NAT table to find the first source address to which the further destination address corresponds, and inserting the first source address in the header of the further data packet in place of the further destination address, and forwarding the further data packet over the first network.

In some embodiments, the first network is a private network, and the second network is a public network.

There is also provided, in accordance with an embodiment of the invention, apparatus for network communication, including a plurality of ports, including at least a first port configured to receive from a first network a data packet having a header specifying a first source address in the first network and a destination address in a second network, and a second port configured to transmit the data packet to the second network. A memory is configured to store a network address translation (NAT) table. Processing circuitry is configured to look up the first source address in the NAT table and upon finding, in response to looking up the first source address, that the first source address is not listed in the NAT table, to add an entry to the NAT table specifying a second source address in the second network corresponding to the first source address, and responsively to adding the entry, to predictively select one or more additional first source addresses in the first network that are not listed in the NAT table and from which further data packets are expected to be received, and to add one or more further entries to the NAT table specifying one or more second source addresses in the second network corresponding to the one or more additional first source addresses.

The present invention will be more fully understood from the following detailed description of the embodiments thereof, taken together with the drawings in which:

DETAILED DESCRIPTION OF EMBODIMENTS

Overview

NAT gateways typically store a NAT table with entries indicating the correspondence between private and public IP addresses. (The table entries can also be used in translating other packet header fields, such as Layer-4 protocol ports.) The entries in the NAT table can be either static or dynamic. In static entries, each private IP address has its own, fixed public IP address, which is held constantly in the table and not replaced. The number of available entries in the NAT table, however, may not be large enough to allocate a static entry to each IP address in the private network. In this case, entries are allocated dynamically to private IP addresses that transmit outgoing packets to the public network.

When the gateway receives an outgoing packet from the private network, forwarding logic in the gateway checks the source IP address and port against the entries in the NAT table. When a matching entry is found, the forwarding logic modifies the packet header accordingly and forwards the packet immediately to the public network. If no match is found, the forwarding logic traps the packet and "punts" the appropriate packet header fields to a software-driven controller in the gateway. The controller allocates a new dynamic NAT entry to this source IP address and inserts the entry into the NAT table. The trapped packet, as well as further packets from the same source IP address, can then be forwarded using this NAT entry. After a period of inactivity of a given dynamic NAT entry, the entry may be aged out and removed from the table to make room for new entries.

Punting packets to the gateway controller for software-based handling adds substantial latency to the forwarding process. When the gateway is required to handle a large number of different packet flows, the load of the NAT update process on the controller can be heavy, thus increasing latency still further. It is therefore desirable to increase the rate of NAT table hits by the forwarding logic and thus to decrease as far as possible the number of packets that are punted. Although the problem of NAT table misses may be mitigated by increasing the size of the table, it is often impractical to provide a high-speed memory of sufficient size for this purpose.

Embodiments of the present invention that are described herein address the problem of NAT table misses by populating the NAT table predictively, i.e., adding entries to the table for packet flows that are expected to occur in the near future, even before such packets have actually reached the gateway. The predictions can be based, for example, on the pattern of private source addresses encountered by the gateway in packets that were recently received from the private network. Machine learning techniques, such as training a recurrent neural network, can be used to learn and apply such patterns. Using this sort of prediction to populate the NAT table, the rate of NAT table hits can be increased considerably, thus reducing overall packet latency and easing the load on the gateway controller.

In the disclosed embodiments, packet processing circuitry in a NAT gateway includes both packet forwarding logic and prediction logic. When the NAT gateway receives a data packet through one of its ports from a private network, with a packet header specifying a private source address and a public destination address, the forwarding logic looks up the private source address in a NAT table. Upon finding an appropriate entry, the forwarding logic reads the public source address corresponding to the private source address from the NAT table, inserts the public source address in the header of the data packet in place of the private source address, and transmits the data packet with the public source address in the header to a public network. Additionally or alternatively, the NAT table entries can be applied in modifying one or more other packet header fields, such as the destination address, the source port, and the destination port.

When the forwarding logic finds that the private source address is not listed in the NAT table, the processing circuitry adds a new entry to the NAT table specifying a public source address corresponding to this private source address. In addition, the prediction logic applies the private source address in selecting one or more additional private source addresses that are not listed in the NAT table and from which further data packets are expected to be received. The processing circuitry adds further entries to the NAT table specifying public source addresses corresponding to these additional selected private source addresses. The forwarding circuitry is then able to use the new NAT table entries in forwarding both the current packet and future packets.

For the sake of concreteness and clarity, certain methods and algorithms for NAT prediction are described hereinbelow with reference to a specific sort of gateway architecture and configuration, between private and public networks. Alternatively, the methods, algorithms, and gateway architectures described herein may be used in other NAT applications, including NAT between two private networks or two public networks. Further alternatively or additionally, the principles of the present invention may be applied in other sorts of packet forwarding and processing devices, using other architectures and algorithms for NAT prediction. All such alternative embodiments are considered to be within the scope of the present invention. Furthermore, the predictive methods that are described hereinbelow for populating tables used in packet forwarding may be applied, mutatis mutandis, to other network protocols and services that are known in the art, such as Layer-2 learning and Bidirectional Forwarding Detection (BFD).

System Description

Figure 1:
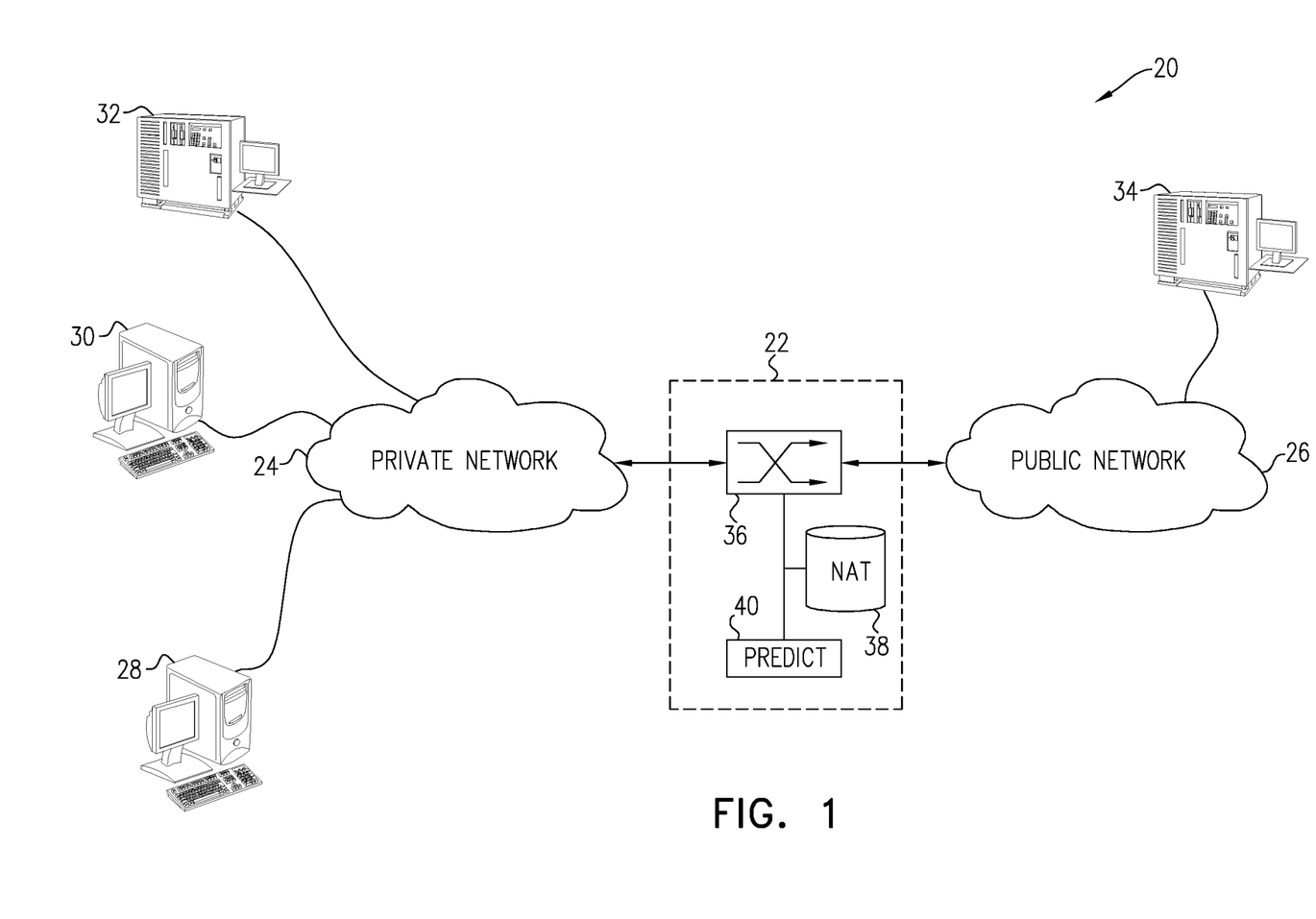
FIG. 1 is a block diagram that schematically illustrates a network communication system, in accordance with an embodiment of the invention.

FIG. 1 is a block diagram that schematically illustrates a network communication system 20, in accordance with an embodiment of the invention. In system 20, a NAT gateway 22 connects a first network, which in this example is a private network 24, such as an enterprise network or data center network, to a second network, for example a public network 26, such as the public Internet. Networks 24 and 26 are both assumed to be IP networks. Thus, computers 28, 30, 32 on private network 24 are identified by private IP source addresses, while a server on public network 26 is identified by a public IP address.

NAT gateway 22 is typically configured as a router, with forwarding logic 36 for forwarding packets from private network 24 to public network 26 and vice versa. Upon receiving a packet from private network 24 with a header specifying a private source IP address, for example a packet from computer 28, with a public destination IP address, such as the address of server 34, forwarding logic 36 looks up the private source IP address in a NAT table 38. NAT table 38 is typically configured as a database, but alternatively other suitable list formats may be used. The lookup in the NAT table may also include other header fields, such as source and/or destination port, as well as the destination IP address. Based on the entry in NAT table 38, forwarding logic 36 inserts a public source IP address in the packet header and may also modify other header fields, and then transmits the packet to public network 26. To populate NAT table 38, NAT gateway 22 applies prediction logic 40, as noted earlier and described in detail hereinbelow.

When server 34 receives the packet from NAT gateway 22, it will typically return one or more response packets with the destination address field set to the same public IP address that was inserted as the source address by the NAT gateway. Upon receiving this response packet from public network 26, forwarding logic 36 in NAT gateway 22 looks up the destination IP address of the packet in NAT table 38 to find the private source IP address to which the public destination IP address corresponds. (Again, the public source IP address of this packet and the destination and/or source port in the packet header may also be used in the NAT lookup.) Based on the NAT table entry, forwarding logic 36 inserts the appropriate private source IP address in the header of the data packet or packets, for example the private IP address of computer 28, in place of the public destination address, and forwards the packets over private network 24 accordingly.

Figure 2:
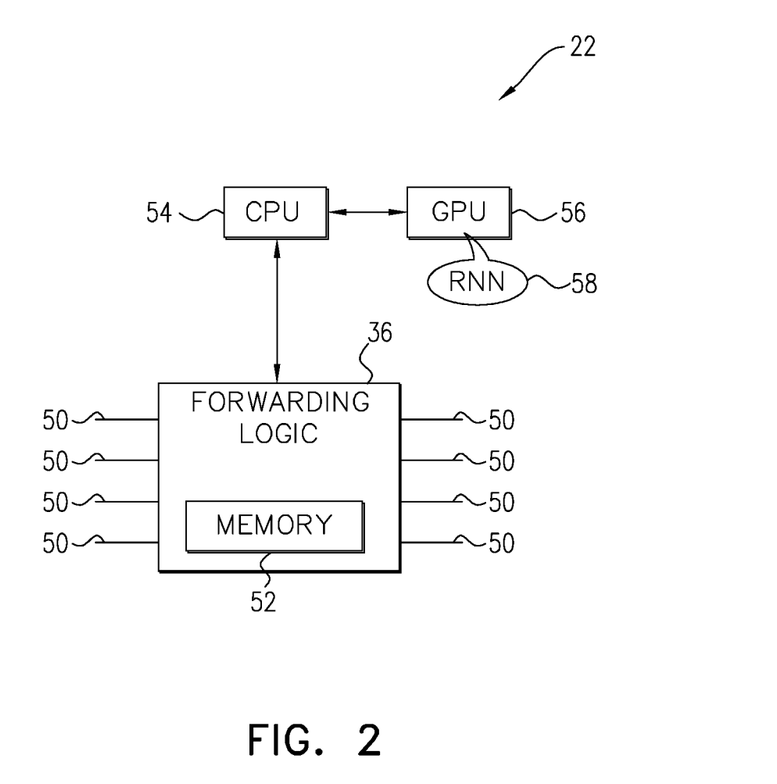
FIG. 2 is a block diagram that schematically shows details of a NAT gateway implementing prediction logic in accordance with an embodiment of the invention.

FIG. 2 is a block diagram that schematically shows details of NAT gateway 22 implementing prediction logic in accordance with an embodiment of the invention. Gateway 22 comprises multiple ports 50, including at least one port connected to private network 24 and at least one other port connected to public network 26. Ports 50 typically comprise suitable physical layer (PHY) and media access control (MAC) interfaces, for example Ethernet PHY and MAC interfaces, which are implemented in suitable hardware circuits as are known in the art. Ports 50 are interconnected through forwarding logic 36, which is configured to perform the functions described herein in a suitable application-specific integrated circuit (ASIC), for example. A high-speed memory, such as a static random-access memory (SRAM) 52, which is integrated with or connected to forwarding logic 36, holds NAT table 38 (FIG. 1), as well as other data used by the forwarding logic, such as routing tables.

Higher-level functions of gateway 22, including adding entries to the NAT table in memory 52, are carried out by a controller, such as a central processing unit (CPU) 54, under the control of suitable software. As noted earlier, these functions include the application of prediction logic 40 (FIG. 1) for the purpose of adding entries to NAT table 38 for private certain source addresses before gateway 22 has actually received packets from these source addresses. In the pictured embodiment, this prediction logic is implemented using a suitable neural network running on a graphics processing unit (GPU) 56. In one embodiment, a recurrent neural network (RNN) 58 is used for this purpose, as described further hereinbelow. Alternatively, other types of neural networks, as well as other sorts of machine learning and prediction algorithms, may be used for the purposes of NAT table entry prediction.

In the embodiment shown in FIG. 2, CPU 54 and GPU 56 together perform the functions of prediction logic 40, and these units together with forwarding logic 36 serve as the processing circuitry in gateway 22. In one embodiment, the forwarding logic, CPU and GPU are all implemented in a single integrated circuit, such as the NVIDIA® BlueField® data processing unit (DPU), available from NVIDIA (Santa Clara, Calif.). Alternatively, the functions of the processing circuitry in gateway 22 may be implemented in a set of two or more chips with suitable interconnections. Furthermore, although FIGS. 1 and 2 relate specifically to the operation of a gateway router in system 20, the principles of the present invention may alternatively be implemented in other network devices that implement NAT on a large scale.

Figure 3:
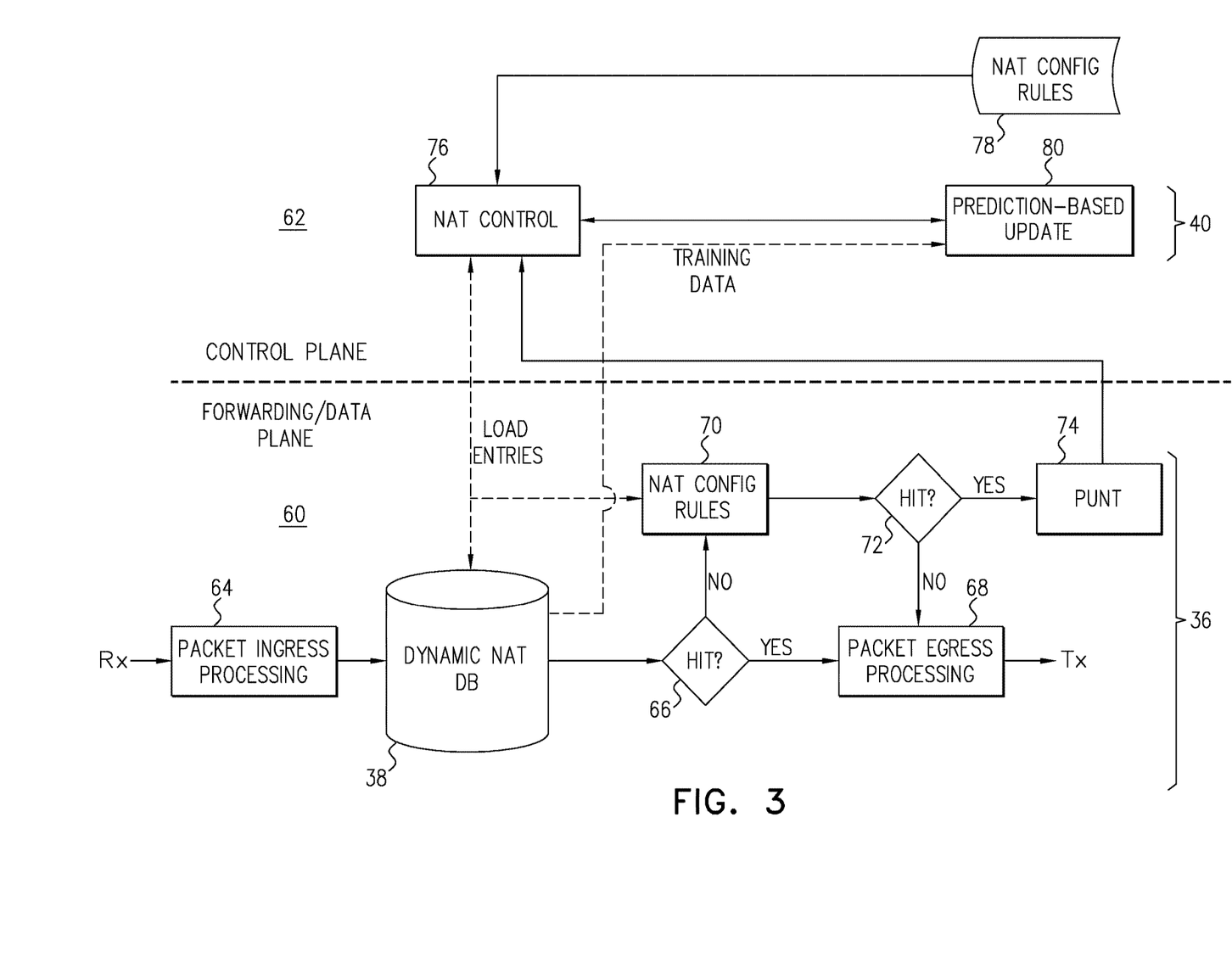
FIG. 3 is a block diagram that schematically illustrates forwarding and control functions of a NAT gateway, in accordance with an embodiment of the invention.

FIG. 3 is a block diagram that schematically illustrates forwarding and control functions of a NAT gateway, such as gateway 22, in accordance with an embodiment of the invention. These functions are divided generally between a data plane 60, which performs the actual NAT lookup and packet forwarding operations, and a control plane 62, which populates the NAT table and carries out the function of prediction logic 40, inter alia. In the embodiment of FIG. 2, data plane 60 is implemented by forwarding logic 36, while control plane 62 is implemented by CPU 54 and GPU 56. Alternatively, as noted earlier, other implementations and functional partitions may be used. FIG. 3 shows only the functions of gateway 22 that are directly relevant to the novel NAT functionality of the gateway, while other functions that are known in the art are omitted for the sake of simplicity.

In data plane 60, packets received from private network 24 (FIG. 1) are parsed by packet ingress processing logic 64, which extracts the packet header fields needed for NAT lookup. Forwarding logic 36 looks up the private source address (and possibly other fields, such as the source port) of each such incoming packet in NAT table 38. If the lookup is successful (as indicated by a hit 66), forwarding logic 38 reads the corresponding public IP address from the matching NAT table entry and inserts it in the header of the data packet in place of the private source address. Packet egress processing logic 68 completes the assembly of the packet and transmits it to public network 26.

In the present embodiment, memory 52 (FIG. 2) also contains static NAT configuration rules 70, which specify fixed public IP addresses for certain private IP addresses on network 24. When the lookup in the dynamic NAT table 38 is unsuccessful, forwarding logic 36 checks the private source IP address of the packet against the NAT configuration rules. If no corresponding rule is found (as indicated by the absence of a hit 72), forwarding logic 36 uses the public source IP address indicated by the rule and passes the packet to egress processing logic 68.

If the lookup in NAT configuration rules 70 results in a hit 72, forwarding logic 38 punts the packet to control plane 62. The packet is held in a buffer 74 and waits to be reinjected into the forwarding flow until a suitable entry has been added to dynamic NAT table 38.

Within control plane 62, a NAT control process 76, typically running on CPU 54 (FIG. 2), loads entries as required into dynamic NAT table 38. NAT control process 76 is also responsible for loading NAT configuration rules 70, for example on the basis of a configuration input 78 entered by an operator of gateway 22. In addition, NAT control process 76 monitors the ages of entries in NAT table 38 and "ages out" entries that have not been used in forwarding packets for more than a predefined time limit. Once an entry has been aged out, its slot in NAT table 38 can be populated by another entry when required.

When NAT control process 76 loads a new entry for a given private source IP address into NAT table 38 and additional slots are available to be populated in the table, process 76 consults an in-line prediction-based service daemon 80 in order to select one or more additional private source addresses that are not listed in the NAT table and from which further data packets are expected to be received. Daemon 80 may be implemented in software running on a general-purpose processor, such as CPU 54; alternatively or additionally, some of the functions of daemon 80, particularly the computation-intensive functions, may be carried out using special-purpose programmable hardware, such as GPU 56. In either case, the software for selecting and predicting NAT entries to be entered in NAT table 38 may be stored on tangible, non-transitory computer-readable media, such as optical, magnetic, or electronic memory. On the basis of the predictions made by daemon 80, NAT control process 76 adds one or more further entries to the NAT table specifying public source addresses corresponding to these additional predicted private source addresses. The process of prediction is described further hereinbelow with reference to FIGS. 4 and 5.

In some embodiments, daemon 80 predicts and chooses the additional private source addresses by detecting a pattern in the private source addresses of data packets received from private network 24 and selecting the private source addresses that are expected to occur on the basis of this detected pattern. For the purpose of learning the patterns of private source addresses that have occurred in the past, daemon 80 receives and stores training data with respect to the packet flows that have been handled using the entries in NAT table 38. (The term "flow" refers to a sequence of packets having the same value in one or more of their header fields, including at least the source address, and possibly the same source port, destination address, and/or destination port.) For example, the training data may pertain to the times at which new entries for these flows were added to the NAT table in the past. In the embodiment shown in FIG. 5, the training data are used in training a neural network to recognize and respond to the patterns of packet flows. Alternatively, other methods of machine learning and prediction that are known in the art may be used for this purpose, for example statistical methods such as Bayesian prediction.

Methods for Predictive Population of the NAT Table

Figure 4:
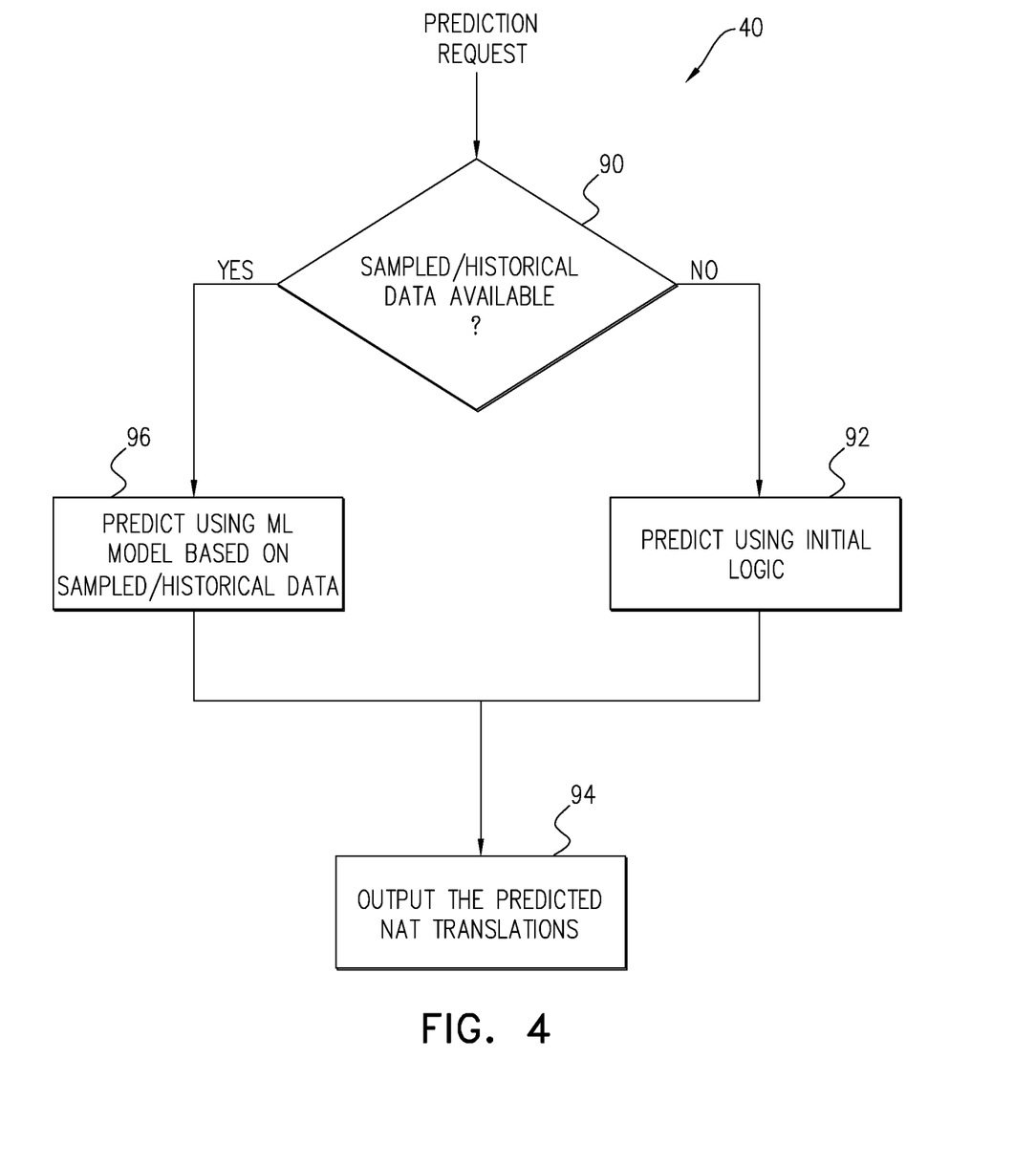
FIG. 4 is a flow chart that schematically illustrates a method for predictive population of a NAT table, in accordance with an embodiment of the invention.

FIG. 4 is a flow chart that schematically illustrates a method for predictive population of NAT table 38 that can be carried out by prediction logic 40, in accordance with an embodiment of the invention. In response to a prediction request from NAT control process 76, daemon 80 checks whether sufficient historical data have been accumulated in order to make a prediction based on past patterns of packet flows handled by NAT table 38, at a training check step 90. For example, several hours of data may be needed in order to train daemon 80 to make reliable predictions. (The training may also be updated from time to time as new training samples are accumulated.)

When there is not yet a sufficient body of historical data for training, daemon 80 predicts the additional entries to be added to NAT table 38 on the basis of preprogrammed logical rules, at a programmed selection step 92. For example, when the private source address of the packet that triggered the NAT table update belongs to a given subnet on private network 24, daemon 80 may select one or more additional private source addresses from this same subnet for addition to NAT table 38, or it may even add all the private source addresses in the given subnet to the NAT table, assuming there is sufficient space in the table. Alternatively or additionally, other logical selection rules may be applied. NAT control process 76 loads the NAT entries for the predicted entries into NAT table 38, at a translation output step 94.

On the other hand, when it is found at step 90 that a sufficient amount of data has accumulated in order to train the machine learning model, daemon 80 predicts the private addresses to add to NAT table 38 using this model, at a model-based prediction step 96. Specifically, based on the private source address of the packet that triggered the NAT table update, together with the pattern of private source addresses and NAT table updates in the packets that preceded it, daemon 80 is able to predict the NAT table entries that are most likely to be required in the immediate future. NAT control process 76 loads these entries into NAT table 38 at step 94. Accurate prediction at step 96 reduces the number of packets that will have to be punted to control plane 62 and thus decreases the latency of forwarding through data plane 60 while reducing the computational load on the control plane.

Figure 5:
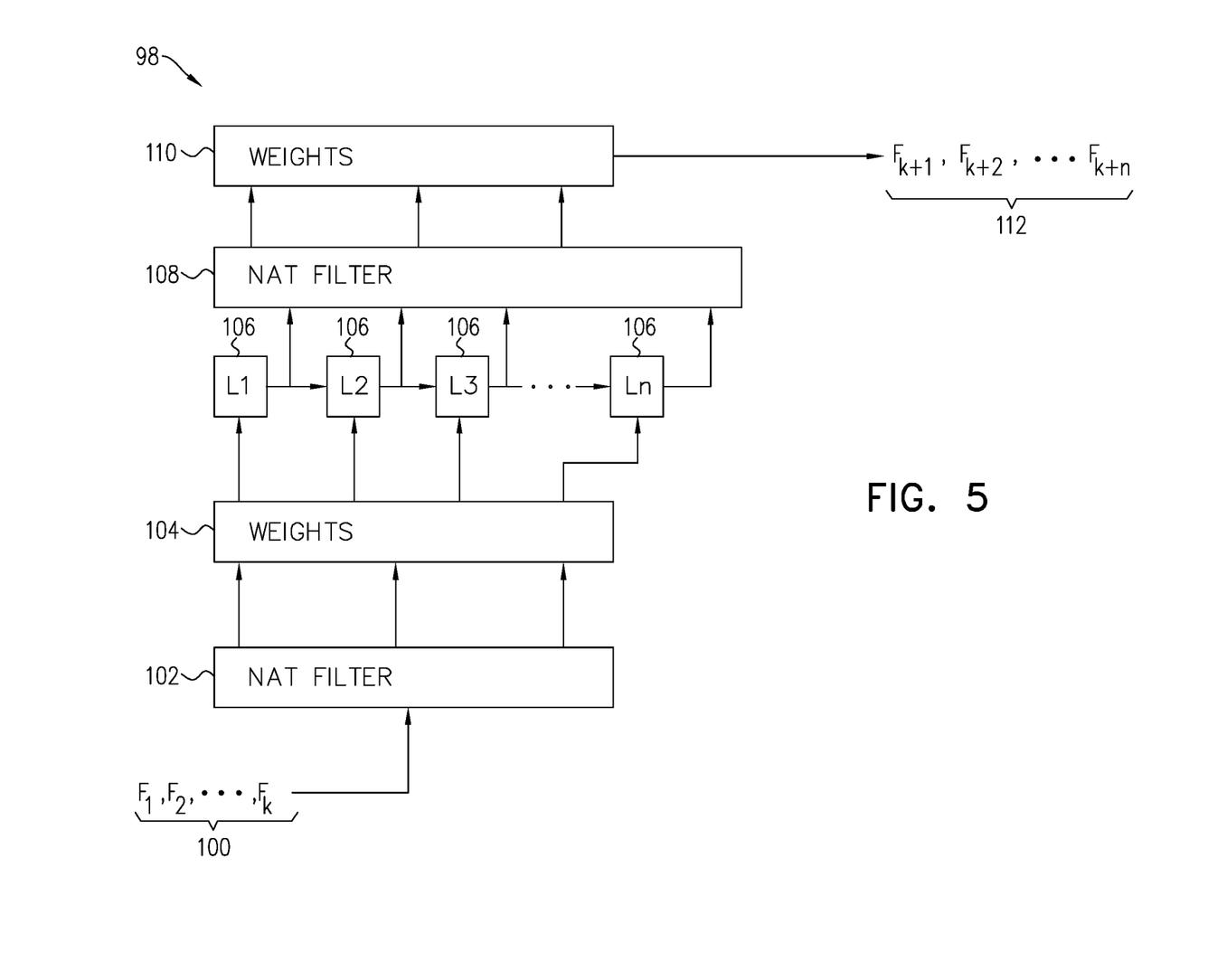
FIG. 5 is a block diagram that schematically illustrates prediction logic for updating entries in a NAT table, in accordance with an embodiment of the invention.

FIG. 5 is a block diagram that schematically illustrates prediction logic 98 for updating the entries in NAT table 38, in accordance with an embodiment of the invention. This embodiment makes use of a recurrent neural network (RNN), comprising multiple repeating layers 106 that are chained together in sequence. In the pictured embodiment, there are n layers 106, which are configured as a Long Short Term Memory (LSTM) network, as is known in the art, in which each layer 106 receives the state and output of the preceding layer. LSTM networks are particularly useful in learning and then recognizing long-term patterns, such as the pattern of private network addresses and updates in NAT table 38. In the present example, the network receives an input sequence 100 of k past packet flows $F_1, F_2, \ldots, F_k$, and outputs a predicted sequence 112 of the next n packet flows $F_{k+1}, F_{k+2}, \ldots, F_{k+n}$.

In some embodiments, not all the flows are necessarily used in making the prediction, and those that do contribute to the prediction may have different weights, reflecting their predictive values. Specifically, flows that will not undergo translation by dynamic NAT table 38, such as flows with private source addresses that are handled by prediction rules 70 (FIG. 3), may be of less relevance to the prediction. For this reason, a NAT filter 102 filters input sequence 100 so as to select the set of private source addresses that are subject to address translation using NAT table 38, and applies only this selected set to prediction logic 98. The remaining flow are filtered out of input sequence 100 and do not contribute to generating predicted sequence 112. Additionally or alternatively, weighting logic 104 assigns weights to the private source addresses of the data packets based on the respective frequencies of the packet flows that they represent, and layers 106 of the LSTM network receive these weighted values. As a consequence, sparse flows, with low packet frequencies, will contribute less to predicted sequence 112. NAT filtering 108 and weights 110 may also be applied to the predicted flows output by the LSTM network, in order to remove irrelevant and sparse flows from the list of entries that are to be added predictively to NAT table 38.

As noted earlier, the architecture of prediction logic 98 that is shown in FIG. 5 is described here by way of example. Other methods for predicting the entries that are to be added to a NAT table, with or without NAT filtering and weighting of the data samples, will be apparent to those skilled in the art after reading the present description. All such methods are considered to be within the scope of the present invention.

The following tables show a list of entries in NAT table 38 as they change over time in response to packet flows forwarded by gateway 22. In these tables, SA and SP represent the private source IP address and source port in the received packet headers; DA and DP represent the public destination IP address and destination port; and NSA and NSP represent the new public source IP address and source port that are inserted in the corresponding packet headers following NAT.

TABLE 1

| | SA | DA | SP | DP | NSA | NSP |
|---|---|---|---|---|---|---|
| 1 | 10.10.10.1 | 100.10.10.1 | P1 | P30 | 91.10.10.1 | PA |
| 2 | 10.10.10.2 | 100.10.10.1 | P2 | P40 | 91.10.10.2 | PB |
| 3 | 20.20.20.1 | 120.10.10.1 | P100 | P50 | 92.10.10.1 | PC |
| 4 | 40.40.40.2 | 140.10.10.1 | P200 | P60 | 94.10.10.2 | PD |
| 5 | 50.10.10.2 | 150.10.10.1 | P300 | P70 | 95.10.10.2 | PE |

In Table 1, NAT control process 76 (FIG. 3) has loaded a certain set of entries into NAT table 38, and prediction logic 40 learns this pattern of entries. Over time, however, these entries age out and are replaced in the NAT table by a new set of entries, as shown in Table 2:

TABLE 2

| | SA | DA | SP | DP | NSA | NSP |
|---|---|---|---|---|---|---|
| 1 | 10.10.10.10 | 100.10.10.10 | P1 | P30 | 91.10.10.10 | PA |
| 2 | 20.20.20.20 | 120.10.10.20 | P2 | P40 | 92.10.10.20 | PB |
| 3 | 20.20.20.30 | 120.10.10.30 | P100 | P50 | 92.10.10.30 | PC |
| 4 | 30.30.30.10 | 130.10.10.10 | P200 | P60 | 93.10.10.10 | PD |
| 5 | 30.30.30.20 | 130.10.10.20 | P300 | P70 | 93.10.10.20 | PE |

Subsequently, the entries in slots 2-5 in Table 2 also age out. A new packet is punted to control plane 62 with SA=10.10.10.1, DA=100.10.10.1, SP=P1 and DP=P30. NAT control process 76 adds an entry for this flow in slot 2 of the NAT table, as shown in Table 3:

TABLE 3

| | SA | DA | SP | DP | NSA | NSP |
|---|---|---|---|---|---|---|
| 1 | 10.10.10.10 | 100.10.10.10 | P1 | P30 | N150.10.10.10 | PA |
| 2 | 10.10.10.1 | 100.10.10.1 | P1 | P30 | 91.10.20.1 | PA |

TABLE 3-continued

| | SA | DA | SP | DP | NSA | NSP |
|---|---|---|---|---|---|---|
| 3 | 20.20.20.1 | 120.10.10.1 | P100 | P50 | 92.10.30.1 | PC |
| 4 | 40.40.40.2 | 140.10.10.1 | P200 | P60 | 94.10.40.2 | PD |
| 5 | 50.10.10.2 | 150.10.10.1 | P300 | P70 | 93.10.10.20 | PE |

Furthermore, daemon 80 recognizes that this entry was part of a pattern of flows that occurred previously, as illustrated by the entries in slots 3-5 in Table 1. NAT control process 76 therefore adds these entries predictively into slots 3-5 in Table 3, in place of the aged-out entries.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for network communication, comprising:
receiving from a first network a data packet having a header specifying a first source address in the first network and a destination address in a second network;
looking up the first source address in a network address translation (NAT) table; and
upon finding, in response to looking up the first source address, that the first source address is not listed in the NAT table:
adding an entry to the NAT table specifying a second source address in the second network corresponding to the first source address;
predictively selecting one or more additional first source addresses in the first network that are not listed in the NAT table and from which further data packets are expected to be received; and
adding one or more further entries to the NAT table specifying one or more second source addresses in the second network corresponding to the one or more additional first source addresses.

2. The method according to claim 1, wherein the first source address and the destination address comprise Internet Protocol (IP) addresses.

3. The method according to claim 2, wherein looking up the first source address comprises searching for the entry in the NAT table based on both the first source address and the destination IP address.

4. The method according to claim 2, wherein the header specifies a protocol port of the data packet, and wherein looking up the first source address comprises searching for the entry in the NAT table based on both the first source address and the protocol port.

5. The method according to claim 1, and comprising periodically removing from the NAT table one or more of the entries that have not been accessed over a predefined aging period.

6. The method according to claim 1, wherein the first source address belongs to a given subnet, and wherein predictively selecting the one or more additional first source addresses comprises selecting at least one additional first source address from the given subnet.

7. The method according to claim 6, wherein selecting the at least one additional first source address comprises adding all the first source addresses in the given subnet to the NAT table.

8. The method according to claim 1, wherein predictively selecting the one or more additional first source addresses comprises detecting a pattern in the first source addresses of data packets received from the first network, and selecting at least one additional first source address responsively to the detected pattern.

9. The method according to claim 8, wherein detecting the pattern comprises applying a recurrent neural network model to the first source addresses.

10. The method according to claim 8, wherein detecting the pattern comprises filtering the data packets so as to select a set of the first source addresses that are subject to address translation using the NAT table, and applying only the selected set of the first source addresses to the prediction logic in order to detect the pattern.

11. The method according to claim 8, wherein detecting the pattern assigning weights to the first source addresses of the data packets responsively to respective frequencies of packet flows from the first source addresses, and applying the weights in the prediction logic in order to detect the pattern.

12. The method according to claim 1, and comprising:
reading from the NAT table the second source address in the second network corresponding to the first source address, and inserting the second source address in the header of the data packet in place of the first source address; and
transmitting the data packet with the second source address in the header to the second network.

13. The method according to claim 12, wherein transmitting the data packet comprises modifying, responsively to the entry in the NAT table, at least one field in the header of the data packet, selected from a group of fields consisting of the destination address, a source port, and a destination port.

14. The method according to claim 12, and comprising:
receiving from the second network a further data packet having a further destination address identical to the second source address that was inserted in the header of the transmitted data packet;
looking up the further destination address in the NAT table to find the first source address to which the further destination address corresponds; and
inserting the first source address in the header of the further data packet in place of the further destination address, and forwarding the further data packet over the first network.

15. The method according to claim 1, wherein the first network is a private network, and the second network is a public network.

16. Apparatus for network communication, comprising:
a plurality of ports, comprising at least a first port configured to receive from a first network a data packet having a header specifying a first source address in the first network and a destination address in a second network, and a second port configured to transmit the data packet to the second network;
a memory, configured to store a network address translation (NAT) table; and
processing circuitry, which is configured to look up the first source address in the NAT table and upon finding, in response to looking up the first source address, that the first source address is not listed in the NAT table, to add an entry to the NAT table specifying a second source address in the second network corresponding to the first source address, and responsively to adding the entry, to predictively select one or more additional first source addresses in the first network that are not listed in the NAT table and from which further data packets are expected to be received, and to add one or more further entries to the NAT table specifying one or more second source addresses in the second network corresponding to the one or more additional first source addresses.

17. The apparatus according to claim 16, wherein the first source address and the destination address comprise Internet Protocol (IP) addresses.

18. The apparatus according to claim 17, wherein the processing circuitry is configured to search for the entry in the NAT table based on both the first source address and the destination IP address.

19. The apparatus according to claim 17, wherein the header specifies a protocol port of the data packet, and wherein the processing circuitry is configured to search for the entry in the NAT table based on both the first source address and the protocol port.

20. The apparatus according to claim 16, wherein the processing circuitry is configured to periodically remove from the NAT table one or more of the entries that have not been accessed over a predefined aging period.

21. The apparatus according to claim 16, wherein the first source address belongs to a given subnet, and wherein predictively selecting the one or more additional first source addresses comprises selecting at least one additional first source address from the given subnet.

22. The apparatus according to claim 21, wherein selecting the at least one additional first source address comprises adding all the first source addresses in the given subnet to the NAT table.

23. The apparatus according to claim 16, wherein predictively selecting the one or more additional first source addresses comprises detecting a pattern in the first source addresses of data packets received from the first network, and selecting at least one additional first source address responsively to the detected pattern.

24. The apparatus according to claim 23, wherein detecting the pattern comprises applying a recurrent neural network model to the first source addresses.

25. The apparatus according to claim 23, wherein detecting the pattern comprises filtering the data packets so as to select a set of the first source addresses that are subject to address translation using the NAT table, and applying only the selected set of the first source addresses to the prediction logic in order to detect the pattern.

26. The apparatus according to claim 23, wherein detecting the pattern assigning weights to the first source addresses of the data packets responsively to respective frequencies of packet flows from the first source addresses, and applying the weights in the prediction logic in order to detect the pattern.

27. The apparatus according to claim 26, wherein the processing circuitry is configured to read from the NAT table the second source address in the second network corresponding to the first source address, to insert the second source address in the header of the data packet in place of the first source address, and to transmit the data packet with the second source address in the header to the second network.

28. The apparatus according to claim 27, wherein the processing circuitry is configured to modify, responsively to the entry in the NAT table, at least one field in the header of the data packet, selected from a group of fields consisting of the destination address, a source port, and a destination port.

29. The apparatus according to claim 28, wherein the second port is coupled to receive from the second network a further data packet having a further destination address identical to the second source address that was inserted in the header of the transmitted data packet, and
wherein the processing circuitry is configured to look up the further destination address in the NAT table to find the first source address to which the further destination address corresponds, to insert the first source address in the header of the further data packet in place of the further destination address, and to forward the further data packet over the first network.

30. The apparatus according to claim 16, wherein the first network is a private network, and the second network is a public network.

* * * * *